United States Patent [19]

Atkins et al.

[11] Patent Number: 4,865,399

[45] Date of Patent: Sep. 12, 1989

[54] VEHICLE ANTI-LOCK BRAKE SYSTEM

[75] Inventors: Thomas M. Atkins; Brian C. Tuck, both of Ann Arbor; Edward N. Fuller, Manchester; Peter Every, Livonia, all of Mich.

[73] Assignee: Kelsey Hayes Company, Romulus, Mich.

[21] Appl. No.: 283,689

[22] Filed: Dec. 13, 1988

Related U.S. Application Data

[63] Continuation-in-part of Ser. No. 63,361, Jun. 15, 1987, Pat. No. 4,790,607, which is a continuation-in-part of Ser. No. 702,765, Feb. 19, 1985, Pat. No. 4,673,226, and a continuation-in-part of Ser. No. 53,221, May 22, 1987, Pat. No. 4,828,335, which is a continuation-in-part of Ser. No. 764,162, Aug. 9, 1985, Pat. No. 4,668,023.

[51] Int. Cl.$^4$ .......................... B60T 8/40; B60T 8/50
[52] U.S. Cl. .................................. 303/116; 303/110; 303/119; 303/61
[58] Field of Search ............... 303/116, 110, 119, 61, 303/109, 97, 106, 100, 6.01, 9.62, 9.71, 10; 188/181 A, 349; 364/426.02; 180/197, 244

[56] References Cited

U.S. PATENT DOCUMENTS

| | | | |
|---|---|---|---|
| 3,514,160 | 5/1970 | Leiber | 303/119 |
| 3,515,440 | 6/1970 | Every et al. | 303/115 |
| 3,521,934 | 7/1970 | Leiber | 303/119 |
| 3,540,780 | 11/1970 | Okamoto et al. | 303/106 |
| 3,550,966 | 12/1970 | Leiber | 303/119 |
| 3,617,098 | 11/1971 | Leiber | 303/119 |
| 3,630,579 | 12/1971 | Rodi | 188/181 A |
| 3,731,979 | 5/1973 | Mikaila | 303/DIG. 4 |
| 3,761,140 | 9/1973 | Lewis et al. | 303/114 |
| 3,850,480 | 11/1974 | Atkins | 303/106 |
| 3,857,613 | 12/1974 | Arikawa | 303/109 |
| 3,870,376 | 3/1975 | Riordan | 303/92 |
| 3,880,474 | 4/1975 | Schariack | 303/106 X |
| 3,953,080 | 4/1976 | Brenner | 303/106 |
| 3,975,060 | 8/1976 | Hirayama | 188/349 X |
| 3,981,543 | 9/1976 | Atkins | 303/115 X |
| 3,999,808 | 12/1976 | Belart | 303/116 |
| 4,036,537 | 7/1977 | Fleagle | 303/106 |
| 4,073,542 | 2/1978 | Yabuta et al. | 188/349 X |
| 4,077,675 | 3/1978 | Leiber et al. | 303/106 |
| 4,085,978 | 4/1978 | Nogami | 188/349 X |
| 4,091,348 | 5/1978 | Kawanoto et al. | 335/277 X |
| 4,395,073 | 7/1983 | Arikawa et al. | 303/116 |
| 4,418,966 | 12/1983 | Hattwig | 303/100 |

(List continued on next page.)

FOREIGN PATENT DOCUMENTS 2106605 4/1983 United Kingdom ............... 303/119

Primary Examiner—Douglas C. Butler
Attorney, Agent, or Firm—Ralph J. Skinkiss; Mark J. Sobanski

[57] ABSTRACT

A vehicle braking system such as an anti-lock brake system and/or a traction control utilizes a separate solenoid-actuated, two position, three-way valve in each controlled channel of the brake system for controlling the application of pressure to the respective wheel brake circuit. The valve includes a first port connected to the controlled wheel brake(s), a second port connected to an outlet of a hydraulic pump, and a third port connected to the inlet of the hydraulic pump. The valve is only moveable between a first position wherein the outlet of the pump is connected to the wheel brake to increase pressure to the wheel brake, and a second position wherein the wheel brake is connected to the inlet of the pump to decrease pressure to the wheel brake. An electronic control is provided for operating the valve to control the application of pressure to the selected wheel brakes. The control cyclically moves the valve between the first and second positions during a predetermined time period to alternately increase and decrease pressure to the wheel brake. More specifically, the control generates a pulse-width-modulated signal to modulate the time periods during which the valve is maintained in either the first or second positions to control the effective pressure to the wheel brake to obtain a net increase, decrease, or constant pressure to the wheel brake during the predetermined time period.

14 Claims, 7 Drawing Sheets

U.S. PATENT DOCUMENTS

| | | | |
|---|---|---|---|
| 4,435,021 | 3/1984 | Hoenick | 303/119 X |
| 4,462,642 | 7/1984 | Leiber | 303/DIG. 4 |
| 4,466,671 | 8/1984 | Miyasaka | 303/973 |
| 4,480,877 | 11/1984 | Resch | 303/61 X |
| 4,515,343 | 5/1985 | Pischinger et al. | 251/129.15 X |
| 4,523,792 | 6/1985 | Belart et al. | 303/100 X |
| 4,531,708 | 7/1985 | Livet | 251/129.15 X |
| 4,532,951 | 8/1985 | Fermanich | 251/129.15 X |
| 4,552,372 | 6/1985 | Yano et al. | 251/129.15 |
| 4,561,701 | 12/1985 | Fujii et al. | 303/119 |
| 4,568,131 | 2/1986 | Blomberg et al. | 303/61 X |
| 4,668,023 | 5/1987 | Every et al. | 303/119 X |
| 4,673,226 | 6/1987 | Every et al. | 303/109 |
| 4,778,222 | 10/1988 | Numata et al. | 303/116 X |
| 4,779,935 | 10/1988 | Kuwana et al. | 303/116 |
| 4,783,126 | 11/1988 | Arikawa | 303/116 X |
| 4,790,607 | 12/1988 | Atkins | 303/110 X |
| 4,796,957 | 1/1989 | Wakata et al. | 303/116 |

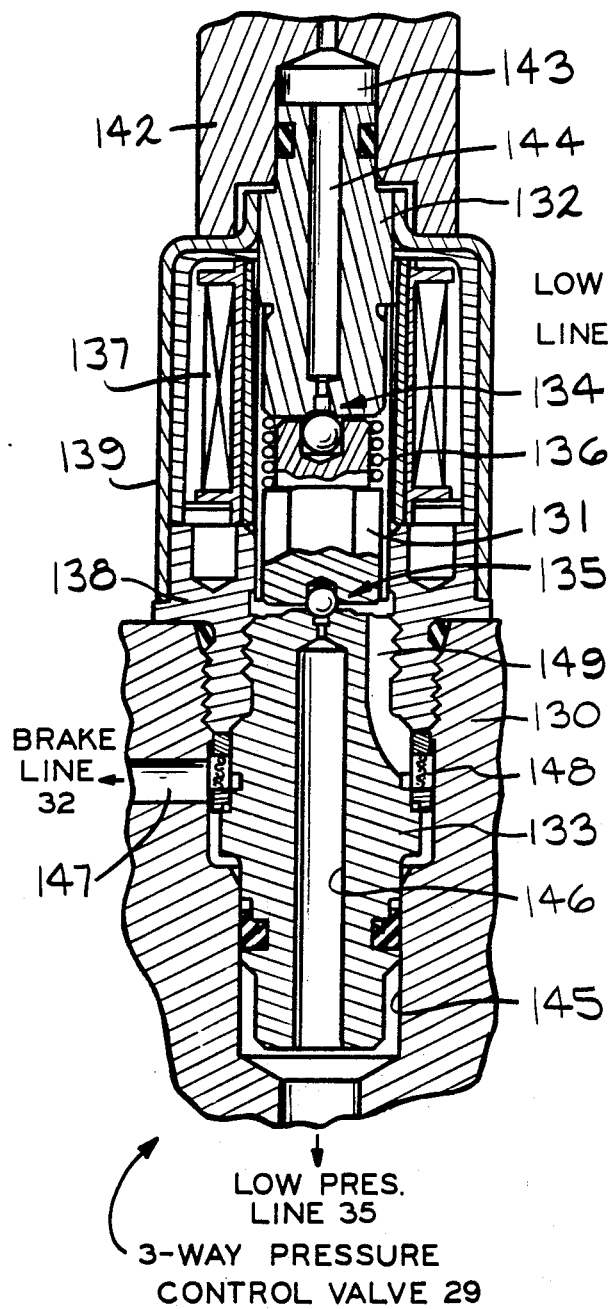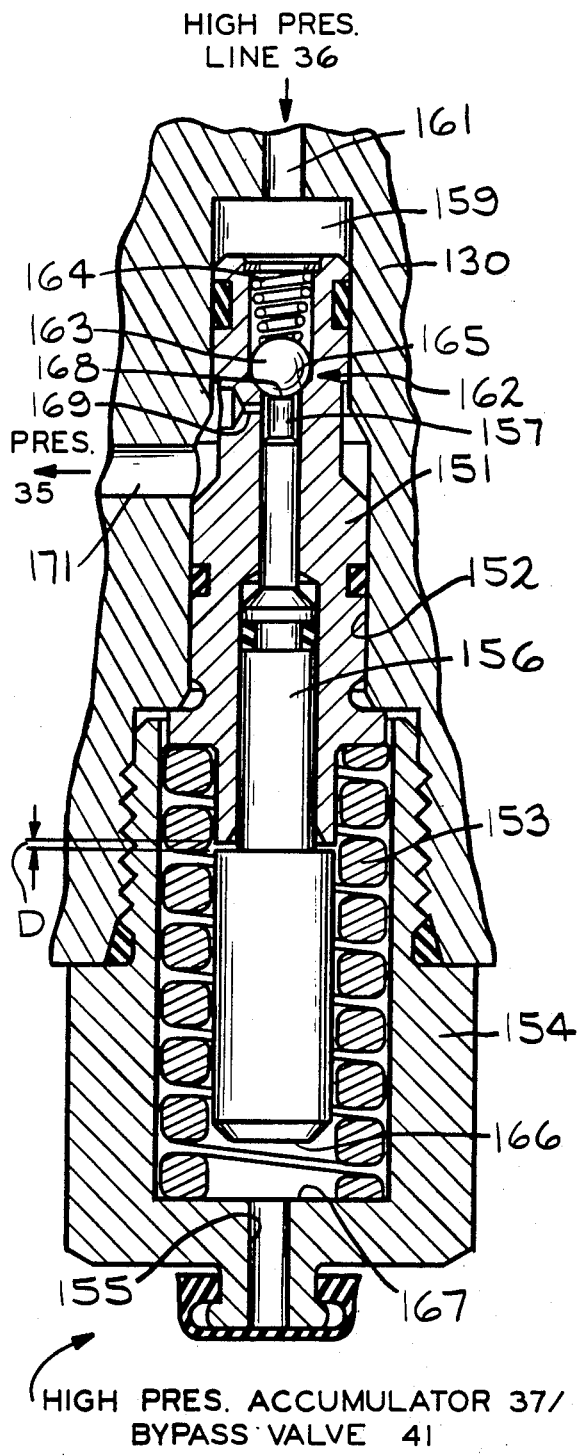
FIG. 7 — 3-WAY PRESSURE CONTROL VALVE 29
FIG. 8 — HIGH PRES. ACCUMULATOR 37/BYPASS VALVE 41

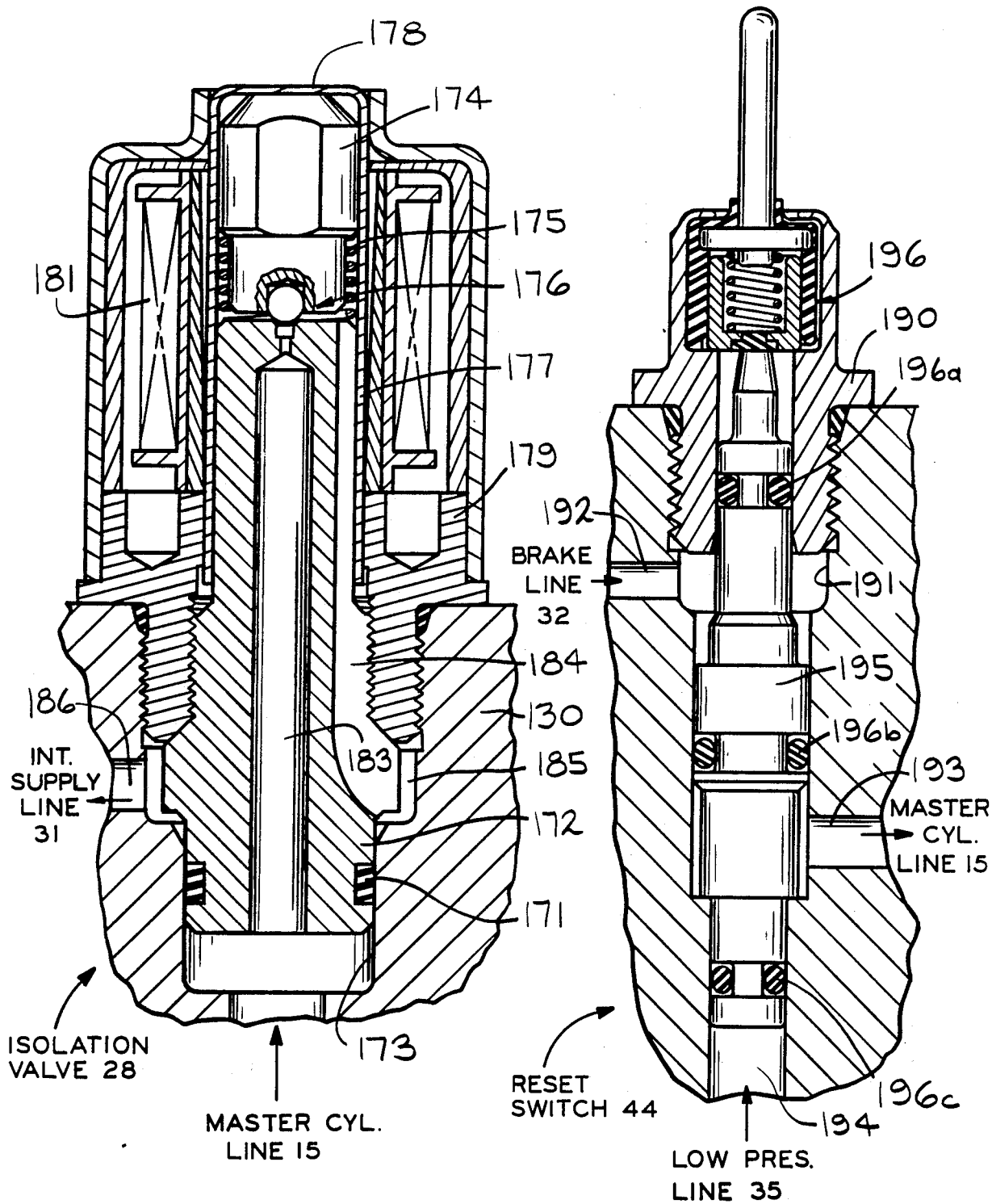

VEHICLE ANTI-LOCK BRAKE SYSTEM

CROSS REFERENCE TO RELATED APPLICATION

This application is a continuation-in-part of copending U.S. patent application Ser. No. 07/063,361, filed June 15, 1987, now U.S. Pat. No. 4,790,607 which application is a continuation-in-part of U.S. patent application Ser. No. 702,765, filed Feb. 19, 1985, and now U.S. Pat. No. 4,673,226. This application is also a continuation-in-part of copending U.S. patent application Ser. No. 07/053,221, filed May 22, 1987, now U.S. Pat. No. 4,828,335 which application is a continuation-in-part of U.S. patent application Ser. No. 764,162, filed Aug. 9, 1985, and now U.S. Pat. No. 4,668,023.

BACKGROUND OF THE INVENTION

The present invention relates generally to a vehicle brake control system and, in particular, to an anti-lock control system which, under anti-lock braking conditions, functions to maintain maximum braking force to at least one selected wheel of a vehicle by cyclically relieving and reapplying pressure to the selected wheel brake in order to maintain the wheel speed within a selected slip range.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing one or more wheels to lock such that excessive slippage between the wheels and the road surface takes place. Such wheel lock-up conditions can lead to loss of directional stability and, possibly, uncontrolled vehicle spinout.

In a continuing effort to improve the operational safety of vehicles, many companies have been actively involved in the development of anti-lock braking systems. While typically such systems are adapted to control the braking of each braked wheel of the vehicle, some systems have been developed for controlling the braking of only a portion of the braked wheels.

Generally, prior art anti-lock systems include a central control unit for monitoring the speed of the controlled wheels to determine when an impending lock-up condition is present. When the brakes of the vehicle are applied and a predetermined slippage has been detected at the controlled wheels, the central control unit functions to control the application of hydraulic pressure to the associated brakes to prevent lock-up of the controlled wheels. Typically, the anti-lock system includes means for cyclically relieving and reapplying pressure to the associated brakes to limit wheel slippage to a safe level, while continuing to produce adequate brake torque to decelerate the vehicle as desired by the driver. Generally, the means for reapplying pressure is a separate hydraulic power source, and solenoid actuated valves are utilized to control the application of hydraulic pressure to the selected wheel brake.

SUMMARY OF THE INVENTION

The present invention concerns a vehicle braking system which utilizes a separate solenoid-actuated, two position, three-way valve in each controlled channel of the brake system for controlling the application of pressure to the respective wheel brake circuit. While the preferred embodiment of the invention is an anti-lock braking system, the present invention can also be incorporated in a vehicle traction control system.

The three-way valve includes a first port connected to the controlled wheel brake(s), a second port connected to an outlet of a hydraulic pump, and a third port connected to the inlet of the hydraulic pump. The valve is only moveable between a first position wherein the outlet of the pump is connected to the wheel brakes to increase pressure to the wheel brake, and a second position wherein the wheel brakes are connected to the inlet of the pump to decrease pressure to the wheel brakes.

An electronic control means is provided for operating the valve to control the application of pressure to the selected wheel brakes. The control includes means for cyclically moving the valve between the first and second positions during a predetermined time period to alternately increase and decrease pressure to the wheel brakes. More specifically, the control means is operable to modulate the time period during which the valve is maintained in either the first or second positions to control the effective pressure to the wheel brake to obtain a net increase, decrease, or constant pressure to the wheel brake during the predetermined time period to prevent lock-up condition of the associated wheel.

In the preferred embodiment of the invention, the valve is controlled by a pulse width modulated (PWM) signal having a duty cycle which is varied to regulate the cyclic reduction and reapplication of pressure to the controlled wheel brakes. In order to accommodate sufficient rapid pressure increases and decreases, a high pressure accumulator is in communication with the outlet of the pump, while a low pressure accumulator is in communication with the inlet of the pump. Also, a solenoid-actuated, normally open isolation valve is connected between a vehicle master cylinder and the associated three-way valve.

Under vehicle braking conditions wherein the electronic control has not detected an impending lock-up condition of the controlled wheels, pressurized brake fluid will be supplied directly from the vehicle master cylinder through the normally open isolation valve and the three-way valve to the selected wheel brakes. Upon detecting an impending lock-up condition of the controlled wheels, the electronic control is operative to immediately actuate the isolation valve to prevent any further increase in fluid pressure from the master cylinder from being supplied to the controlled brakes. The electronic control then generates a PWM signal to control the three-way valve to maintain the pressure in the associate brake line at the maximum possible pressure without causing lock-up of the associated brakes.

It has been found that a two position, three-way valve, which is controlled by a PWM signal, enables the application of pressure to the wheel brakes to be precisely controlled under varying road surface conditions. The above, as well as other advantages of the present invention, will become readily apparent to one skilled in the art when the following detailed description of the invention is read in conjunction with the attached drawings.

BRIEF DESCRIPTION OF THE DRAWINGS

FIG. 7 is a cross-sectional view illustrating the construction of a solenoid actuated, two position, three-way valve which can be utilized with the present invention;

FIG. 8 is a cross-sectional view illustrating a combined high pressure accumulator/by-pass valve which can be utilized with the anti-lock control system of the present invention;

FIG. 9 illustrates a cross-sectional view of an isolation valve which can be utilized with the present invention; and FIG. 10 illustrates a cross-sectional view of a reset switch which can be utilized with the present invention.

DESCRIPTION OF THE PREFERRED EMBODIMENT

It should be noted at the outset of this description that the anti-lock control principles of the present invention can be adapted for use in a variety of braking systems. For example, the present application specifically discusses three separate anti-lock control systems which utilize the principles of the present invention. However, it will be apparent that after reviewing these systems, the principles of the present invention can also be utilized in other anti-lock braking systems, or in traction control systems.

Figure 1:
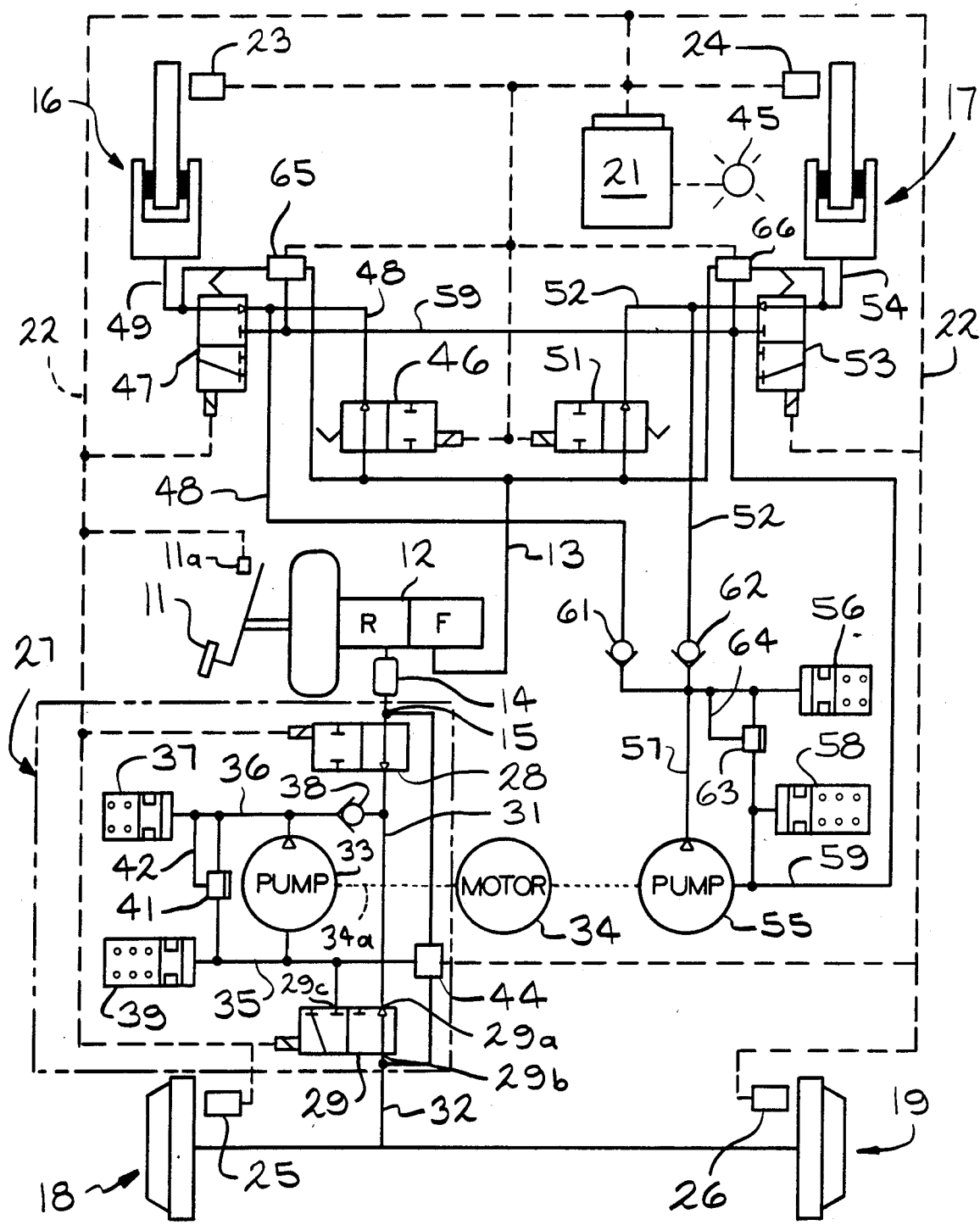
FIG. 1 illustrates a four-wheel anti-lock system incorporating the present invention for use on a vehicle having a dual braking circuit split between the front and rear brakes of the vehicle.
Figure 2:
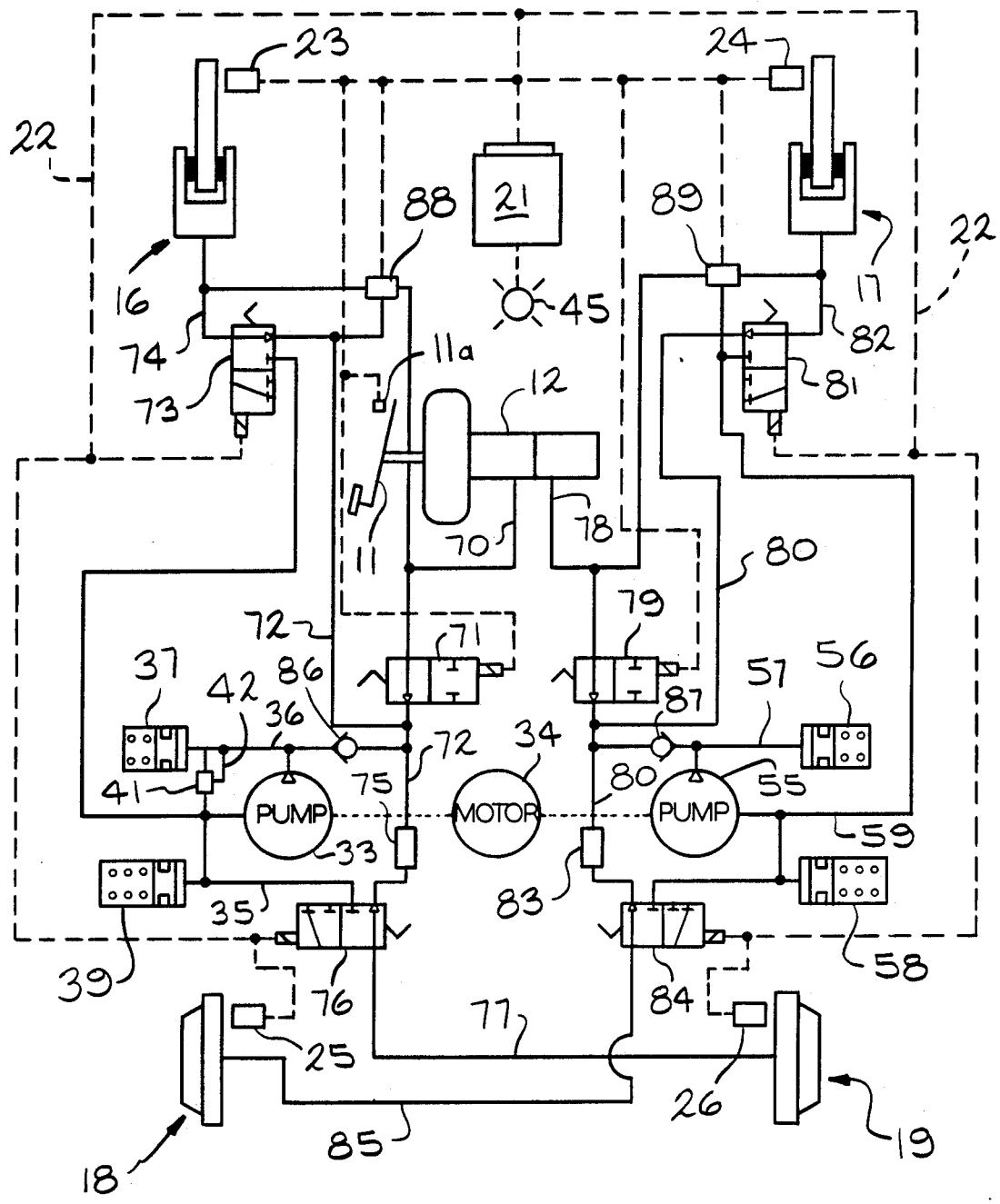
FIG. 2 illustrates a four-wheel anti-lock brake system for use on a diagonally split brake system, wherein one front wheel and the diagonally opposite rear wheel are braked in each circuit.
Figure 3:
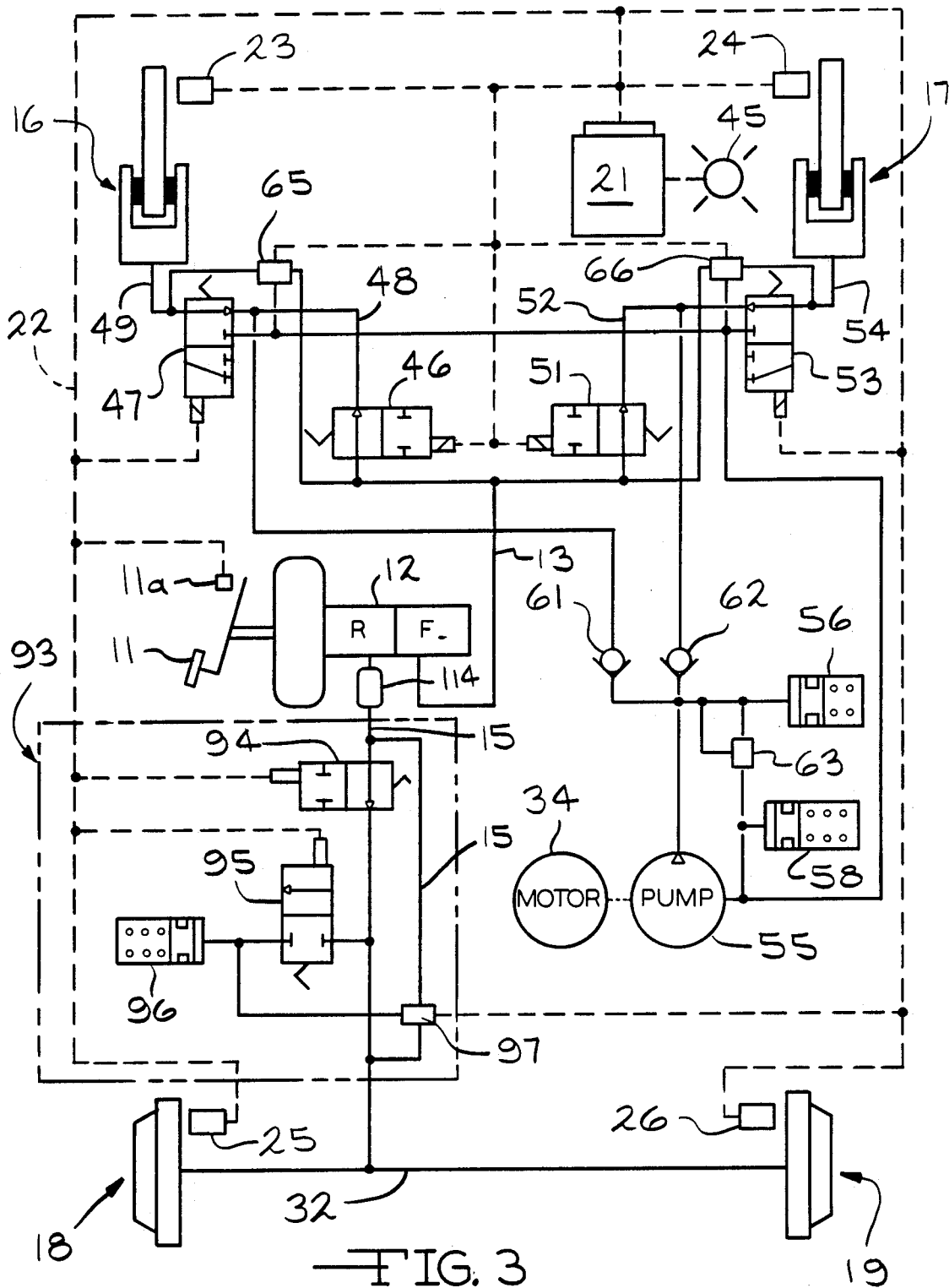
FIG. 3 illustrates an alternate embodiment of a four-wheel vertically split brake system wherein the front brakes of the vehicle are controlled by a pumped anti-lock system, while the rear brakes are controlled by a pumpless anti-lock system.

The three anti-lock systems disclosed in this application are shown in FIGS. 1, 2 and 3. FIG. 1 illustrates a four-wheel anti-lock system incorporating the present invention for use on a vehicle having a dual braking circuit split between the front and rear brakes of the vehicle. This type of system is known as a "vertically" split system. FIG. 2 illustrates a four-wheel anti-lock brake system for use on a diagonally split brake system, wherein one front wheel and the diagonally opposite rear wheel are braked in each circuit. FIG. 3 illustrates an alternate embodiment of a four-wheel vertically split brake system wherein the front brakes of the vehicle are controlled by a pumped anti-lock system such as the one shown in FIG. 1, while the rear brakes are controlled by a pumpless anti-lock system of the type disclosed in above mentioned U.S. Pat. Nos. 4,668,023 and 4,673,226 and U.S. patent applications Ser. Nos. 07/063,361 and 07/053,221, all of which are herein incorporated by reference.

Referring now in more detail to the system illustrated in FIG. 1, there is shown a vehicle brake pedal 11 which operates a conventional brake light switch 11a and is connected to a dual reservoir tandem master cylinder 12. When the brake pedal 11 is depressed by the vehicle operator, the master cylinder 12 supplies hydraulic fluid under pressure to a front brake circuit through a line 13 and to a rear brake circuit through a pressure regulating valve 14 and a line 15. The pressure regulating valve 14 is conventional and is provided to achieve a specific proportional braking force distribution between the front and rear brakes of the vehicle. As is conventional, the tandem master cylinder 12 isolates the front and rear brake lines 13 and 15 from one another for safety reasons such that a pressure loss in one brake circuit does not result in a pressure loss in the other brake circuit.

In the vertically split brake system of FIG. 1, a separate individual pressure control circuit is provided for each front wheel brake, while a single pressure control circuit is provided for both rear wheel brakes. The left front brake is generally represented by a reference numeral 16, the right front brake is shown at 17, the left rear brake is shown at 18, and the right rear brake is shown at 19.

It should be noted that, in FIGS. 1 through 3, hydraulic fluid connections between system components are represented by solid lines, while electrical connections are represented by long dashed lines, and mechanical connections are shown as short dotted lines. For simplicity, the electrical connections are shown as connected to a central electronic control unit 21 by means of dashed lines 22. It will be appreciated that the dashed lines 22 represent a plurality of individual conductors which are necessary to receive signals from the various system sensors, and also to generate signals to the various electrically actuated system components. For example, in FIG. 1, the electronic control 21 is connected via the lines 22 to wheel speed sensors 23, 24, 25, and 26 which in turn are coupled to monitor the speeds of the left front, right front, left rear, and right rear wheels, respectively. It should be noted that, while separate speed sensors are shown at all four wheels in FIGS. 1, 2 and 3, in vehicles having their rear wheels drivingly interconnected by a center rear differential, it may be preferable to utilize a single rear sensor coupled to the input of the differential for monitoring the average speed of the rear wheels.

In FIG. 1, the system components utilized to control the pressure to the vehicle rear brakes in an anti-lock situation are contained within a block represented by reference numeral 27. As will be discussed in more detail hereinafter, all of the basic components of the anti-lock system are contained within the block 27, and, depending on the number of other wheel brake circuits to be controlled, are duplicated as necessary. Normally, under braking conditions in which the anti-lock control is not activated, fluid pressure in the rear line 15 is supplied to the rear brakes 18 and 19 through a normally open isolation valve 28 and a three-way pressure control valve 29. An intermediate supply line 31 connects the isolation valve 28 to a first port 29a of the three-way valve 29, while a final rear supply line 32 connects a second port 29b of the valve 29 to the rear brakes. Both of the valves 28 and 29 are solenoid actuated and are connected to the electric lines 22 to be controlled by the electronic control unit 21. As shown in FIG. 1, the valves 28 and 29 are normally maintained in a position to supply fluid directly from the master cylinder to the rear brakes.

The rear brake control circuit 27 also includes a hydraulic pump 33 which is operated by an electric motor 34 and has an inlet connected to a low pressure line 35 and an outlet connected to a high pressure line 36. The mechanical interconnection between the motor 34 and the pump 33 is represented by a dotted line 34a. The high pressure line 36 is connected directly to a high pressure accumulator 37, and to the intermediate supply line 31 through a check valve 38. The low pressure hydraulic line 35 is directly connected to both a low pressure accumulator 39 and to a third port 29c of the three-way valve 29. A high pressure by-pass valve 41 is connected between the lines 36 and 35 and has a pilot port 42 connected to monitor the pressure in the high pressure line 36.

Under braking conditions wherein neither of the rear wheel speed sensors 25 and 26 have detected an impending lock-up condition of either of the rear wheels, the valves 28 and 29 will remain in their normal, unactivated states as shown in FIG. 1 such that pressurized brake fluid in the line 15 is supplied directly through the valves to the rear brakes. Upon detecting an impending lock-up condition of either rear wheel, the electronic control 21 is operative to immediately actuate the isolation valve 28, thus closing the valve 28 to prevent any further increase in fluid pressure from the master cylinder from being supplied to the rear brakes. Simultaneously, the motor 34 is energized to drive the pump 33 which after fluid is introduced into the low pressure line 35, will charge the high pressure accumulator 37. The electronic control 21 is then operative to control the three-way valve 29 in such a manner as to maintain the pressure in the rear brake line 32 at the maximum possible pressure without causing lock-up of either of the rear brakes.

In accordance with the present invention, the three-way valve 29 receives a pulse width modulated (PWM) signal from the electronic control having a varying duty cycle selected to provide a predetermined control pressure to the rear brakes. When the valve is in the position shown in FIG. 1, high pressure fluid from the line 36 will be supplied through the check valve 38 to the rear brakes. When the valve 29 is actuated, the rear brake line 32 will be connected to the low pressure line 35 such that fluid in the rear brake line will be directed into the low pressure accumulator 39, thus reducing the rear brake pressure. It has been discovered that a PWM signal to the valve can be utilized to precisely control the pressure increases and decreases to the rear brakes. Typically, at a predetermined duty cycle (which is a function of the rear brake pressure), the pressure to the rear brakes will be maintained at a relatively constant level. By increasing the duty cycle at this point, the solenoid will remain actuated for a longer period of time, thus allowing more fluid to flow to the low pressure accumulator and reducing the pressure to the rear brakes. Alternatively, lowering the duty cycle will allow more high pressure fluid to be supplied to the rear brakes, thus increasing the resultant brake pressure.

As long as the anti-lock system remains activated, the motor 34 will run continuously and drive the pump 33. During portions of the PWM duty cycle when the three-way valve 29 is actuated (low pressure line 35 connected to rear brake line 32), no high pressure fluid is required by the brakes and fluid will be pumped into the high pressure accumulator 37. The accumulator 37 is sized so as to provide, in combination with the pump, a sufficient supply of high pressure to the brakes when the valve 29 is returned to its unactivated position. When the accumulator 37 becomes full and the valve 29 is actuated, the by-pass valve 41 senses a pressure increase in the line 36 above a predetermined amount and opens to divert fluid to the low pressure accumulator 39, while maintaining pressure in the high pressure line 36 at the predetermined amount. The check valve 38 is provided to prevent fluid flow from the master cylinder 12 into high pressure line 36 and accumulator 37 during vehicle braking without the rear anti-lock circuit activated. The low pressure accumulator 39 is provided to allow for rapid and low pressure reduction in the rear brake line 32, and also to accommodate any excess brake fluid which can not be returned to the master cylinder during anti-lock control since the isolation valve 28 is closed.

The rear brake circuit 27 also includes a reset switch for monitoring the fluid pressures in the master cylinder output line 15, the rear brake line 32, and the low pressure line 35. The switch 44 is normally closed, and provides two separate functions. First, when the system is operating in the anti-lock mode, the switch 44 is used to monitor the differential pressure between master cylinder output line 15 and the rear brake line 32. Secondly, when the system is not in the anti-lock mode and the vehicle is in a normal braking mode, the switch 44 is used to monitor the condition of the three way valve 29 by monitoring the pressure in the line 35.

To perform its first function, the reset switch 44 is coupled to monitor the pressure difference between the fluid in the lines 15 and 32 and is adapted to open the switch contacts when the pressure in the line 32 is greater than the pressure in the line 15. When the system is in the anti-lock mode and the reset switch contacts are open, this indicates that the isolation valve 28 has closed and that the pressure in the line 15 is greater than the pressure in the line 32 and, when the switch contacts are closed, this indicates that the pressure in the line 15 is equal to or has dropped below the pressure in the line 32.

In instances wherein the switch contacts have opened, and have subsequently closed while the brake light switch 11a has remained actuated, this indicates a situation wherein the operator has initially applied a relatively heavy braking effort to the brake pedal to cause the system to enter an anti-lock mode and close the isolation valve to prevent lock-up of the rear wheels and, subsequently, has reduced braking effort to the pedal without necessarily completely releasing the pedal. It is in this situation that it is desirable to release the anti-lock mode and return the braking system to the normal operating mode. Thus, if the system is in the anti-lock mode and the computer control 21 senses that the reset switch contacts have at one point opened, but are now closed, and the brake pedal is still depressed, the system will return to the normal braking mode. Typically, there is some hysteresis associated with the operation of the reset switch such that the switch contacts do not chatter between a closed and open position when the pressure in the line 15 remains relatively equal to the pressure in the line 32.

When the brake system is not operating in the anti-lock mode, the reset switch 44 is connected to check the condition of one of the valve seats of the three-way valve 29 by monitoring the fluid pressure in the low pressure accumulator 39. At this time, the accumulator 39 should be empty, and the valve seat associated with the port 29c of the three-way valve 29 should prevent pressurized fluid in the lines 31 and 32 from being supplied to the accumulator 39. However, in the event fluid leaks past this valve seat into the accumulator, the pressure increase in the line 35 will be detected by the switch 44, and the switch contacts will open to signal the control 21 of a potentially defective three-way valve. The control 21 is connected to a brake failure warning light 45 which is activated in the event a failure in the anti-lock brake system is detected.

In the event an impending lock-up of either of the front brakes is detected, the brake pressure to each of the front wheel brakes is separately controlled in a manner similar to that described above for the rear brakes. Thus, each front wheel brake will have its own two position, three-way valve associated therewith, along with its own isolation valve. However, as will be discussed in more detail hereinafter, since the single front supply line 13 from the master cylinder supplies fluid pressure for both front wheel brakes, only a single pump, along with single low and high pressure accumulators, are required for controlling both front wheel brakes.

As shown in FIG. 1, pressurized brake fluid in the line 13 is suppled to the left front brake 16 through an isolation valve 46, and a three-way pressure control valve 47. An intermediate supply line 48 is connected between the isolation valve 46 and one port of the three-way valve 47, while a final supply line 49 is connected between a second port of the three-way valve 47 and the brake 16. Pressure is supplied to the right front brake 17 in a similar manner through an isolation valve 51, an intermediate supply line 52, a three-way pressure control valve 53, and a final supply line 54. The valves 46, 47, 51, and 53 are all solenoid actuated and are connected to the electric lines 22.

A second pump 55 is operated by the motor 34 and has an outlet connected to a high pressure accumulator 56 by a high pressure line 57, and an inlet connected to a low pressure accumulator 58 by a low pressure line 59. The high pressure line 57 is connected to the left front intermediate supply line 48 through a check valve 61 and is connected to the right front intermediate supply line 52 through a check valve 62. The low pressure line 59 is connected to both of the third ports of the three-way valves 47 and 53. A high pressure by-pass valve 63 is connected between the high and low pressure lines 57 and 59, and has a sensing line 64 connected to monitor the fluid pressure in the high pressure line 57.

A separate reset switch, having a structure and function similar to the reset switch 44 in the rear brake circuit, is provided for each front brake circuit. In particular, a reset switch 65 is associated with the left front brake circuit and is connected to monitor the pressures in the lines 13, 49 and 59. A reset switch 66 is associated with the right front brake circuit and is connected to monitor the pressures in the lines 13, 54 and 59.

Under braking conditions when neither of the front speed sensors 23 or 24 senses an impending lock-up condition of either of the front wheels, pressure in the line 13 is supplied directly through the isolation valves 46 and 51 and the associated three-way valves 47 and 53 to the respective front wheel brakes. However, during braking of the vehicle, if either of the speed sensors 23 or 24 generates speed signals to the electronic control 21 indicating that one of the front wheel brakes is approaching a lock-up condition, the control 21 is operative to actuate the respective isolation valve associated with the particular wheel circuit, and to energize the motor 34 to activate the pump 55. The respective three-way valve then receives a PWM signal from the electronic control in order to control the pressure to the associated wheel brakes in such a manner to provide maximum fluid pressure to the associated brake without causing a lock-up condition.

Referring now to FIG. 2 which illustrates an anti-lock system for a diagonally split brake system, components of this system having a similar structure and function as the components in FIG. 1 will be identified by like reference numerals. In FIG. 2, the diagonally split system utilizes a separate three-way pressure control valve for each wheel brake, and a separate isolation valve for each master cylinder circuit. Thus, in FIG. 2, two isolation valves are required, while four three-way pressure control valves are necessary. In particular, a first master cylinder circuit supplies pressurized fluid in a line 70 through an isolation valve 71, an intermediate supply line 72 and a three-way valve 73 to a left front brake supply line 74. Pressurized fluid from the line 70 is also supplied through the isolation valve 71 and the intermediate supply line 72 through a pressure regulating valve 75 and a three-way valve 76 to a right rear brake supply line 77. Similarly, a second master cylinder circuit supplies brake pressure fluid in a line 78 through a second isolation valve 79, a second intermediate supply line 80, and a three-way valve 81 to a front right brake supply line 82. Pressurized fluid in the line 78 is also supplied through the isolation valve 79 and the intermediate supply line 80, through a pressure regulating valve 83 and a three-way valve 84 to a left rear brake supply line 85. A check valve 86, which functions in a manner similar to the check valve 38 in FIG. 1, is connected between the high pressure line 36 and the intermediate supply line 72. A second check valve 87 is connected between the high pressure line 57 and the second intermediate supply line 80. The system of FIG. 2 includes separate reset switches 88 and 89 associated with the left front and right front brake circuits, respectively.

The isolation and three-way valves of FIG. 2 operate in a manner similar to the valves of FIG. 1. In particular, when no impending lock-up condition of any wheel has been detected, the valves remain in the unactuated positions as shown in FIG. 2 such that full braking control is by the vehicle driver via the brake pedal 11. However, when the electronic control unit 21 detects an impending wheel lock-up condition via the speed sensors, the control is operable to immediately energize and close the isolation valve associated with the impending locked-up wheel to prevent further increase in pressure to the respective wheel brake, while simultaneously energizing the motor 34 to operate the pumps 33 and 55. The control then generates a PWM signal to the associated three-way valve(s) to control pressure in such a manner to achieve maximum braking without wheel lock-up. In the event all four wheels are under anti-lock control, each of the three-way pressure control valves 73, 76, 81, and 84 are individually controlled by separate PWM signals to control the pressure to the respective wheel brakes. If, during anti-lock control, additional brake fluid is required in a particular wheel brake circuit, the associated isolation valve can be selectively pulsed open. This control continues until the vehicle has stopped, or until the driver has either completely released the brake pedal to open the stop light switch 11a, or has released the pedal to a point wherein one or more of the reset switches indicate that either or both of the isolation valves should be opened to return the circuit(s) to normal braking.

Referring now to FIG. 3, there is shown a vertically split brake system very similar to the system illustrated in FIG. 1, except that the rear brake circuit control section 27 has been replaced with a pumpless anti-lock control system 93 of the type illustrated and described in above-mentioned U.S. Pat. No. 4,673,226. As shown in FIG. 3, the pumpless control circuit includes a solenoid actuated, normally open isolation valve 94 connected between the output of the pressure regulating valve 14 and the rear brake line 32. A solenoid actuated, normally closed dump valve 95 is connected between the rear brake line 32 and a low pressure fluid accumulator 96. A reset switch 97 is connected to monitor the pressure in the accumulator 96 and the lines 15 and 32.

In operation, when a slip condition of the rear wheels is detected, the electronic control 21 closes the isolation valve 94 to hold fluid pressure to the rear brakes at a relatively constant level. If the deceleration of the controlled wheels exceeds a predetermined amount, the electronic control will selectively open the dump valve 95 to enable fluid to flow into the accumulator 96, thereby reducing the deceleration of the rear wheels and correcting the wheel slip condition. As long as the road surface conditions remain the same, the system will hold the rear brake pressure at a constant level until the end of the stop. However, the electronic control can detect when the vehicle travels from a low friction surface to a high friction surface, since under these circumstances the front brake wheels of the system which are controlled by the pumped system will automatically increase the deceleration of the vehicle. Under these conditions, pressure to the rear brakes can generally be increased without causing a lock-up condition. Thus, the control will selectively open the isolation valve 94 to gradually increase pressure to the rear wheel brakes.

Figure 4:
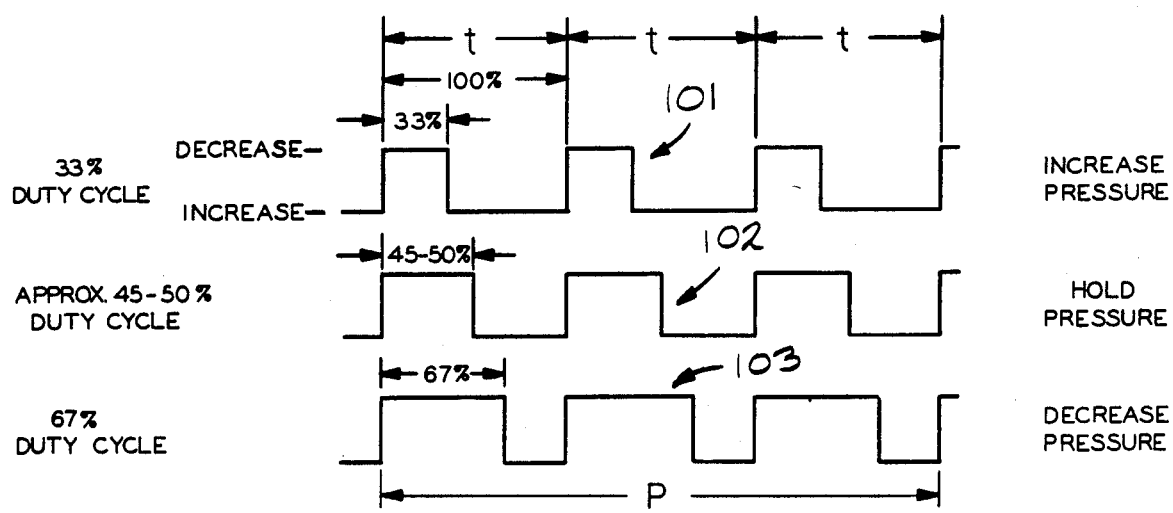
FIG. 4 illustrates three separate PWM wave forms which can be supplied to the three-way valve to selectively control pressure in an individual brake circuit.
Figure 5:
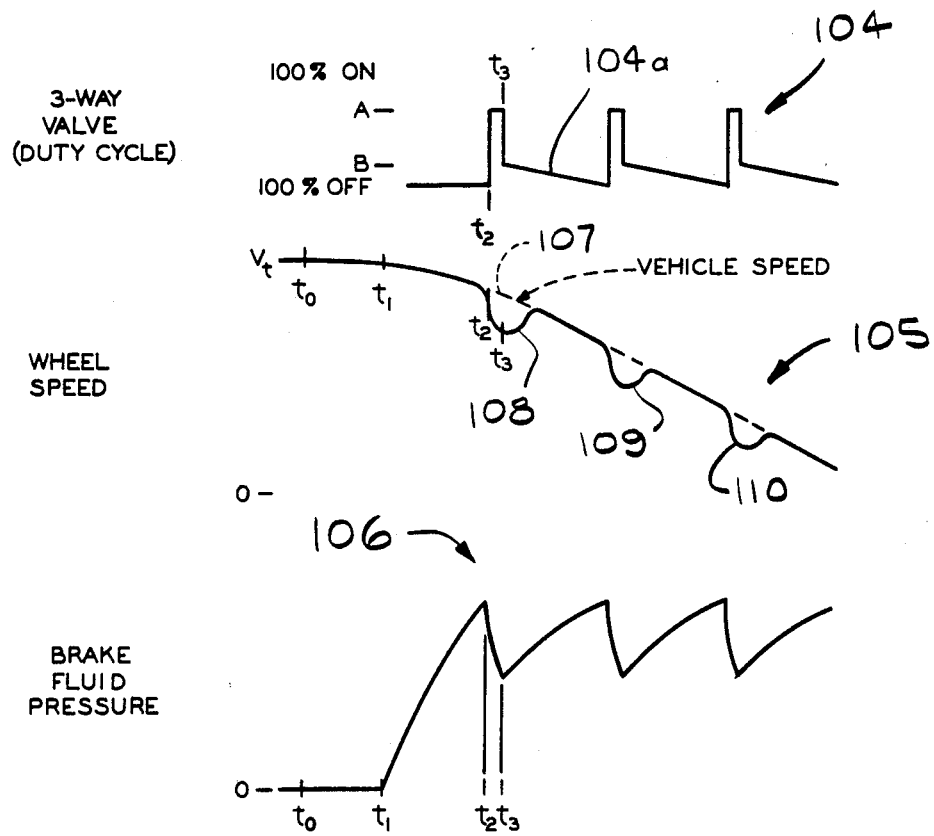
FIG. 5 illustrates a wave form diagram showing the operation of the anti-lock system under a particular braking condition.
Figure 6:
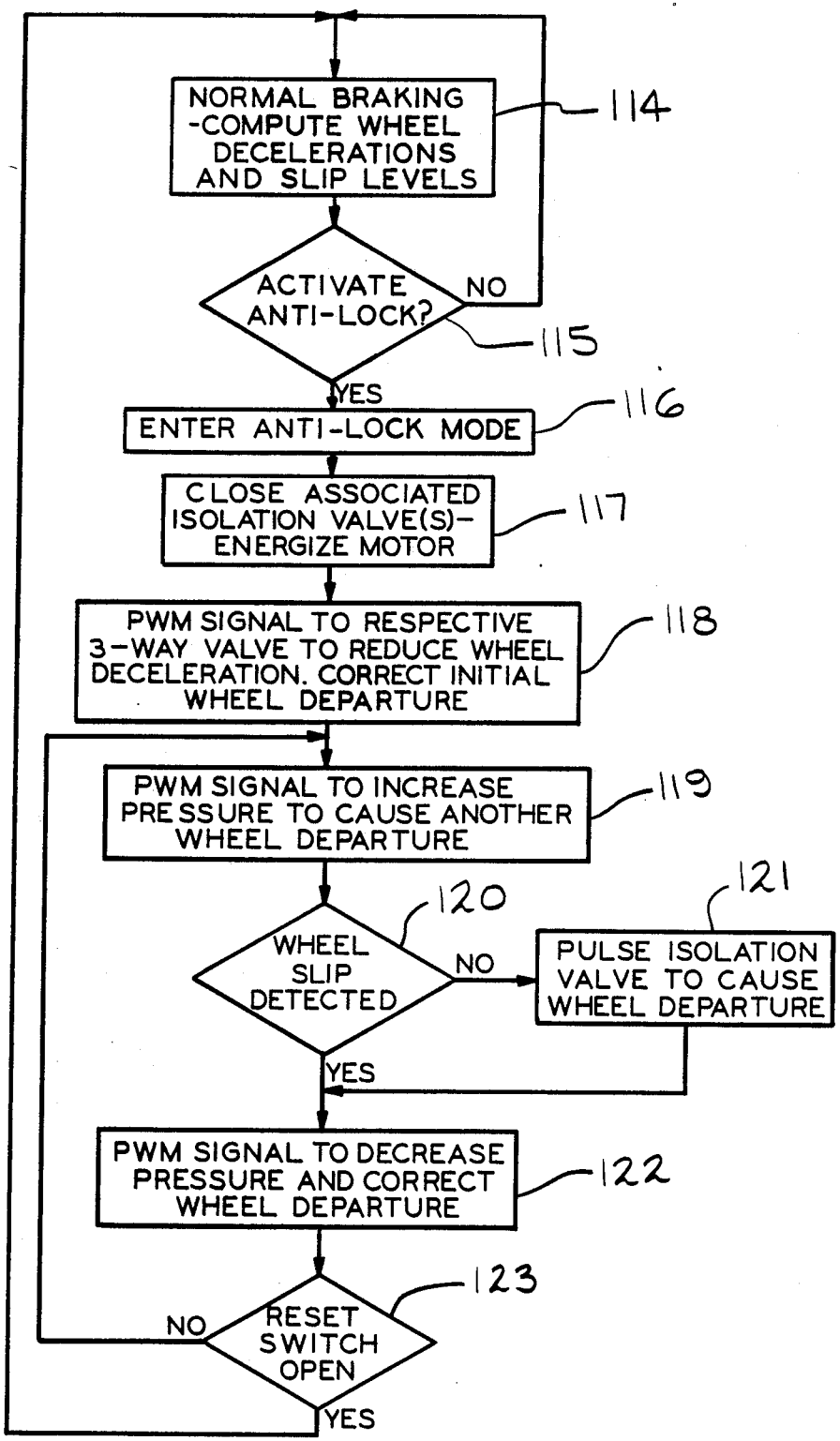
FIG. 6 illustrates a simplified flow diagram showing the basic operation of the anti-lock system of the present invention.

Referring now to FIGS. 4, 5 and 6, the general operation of the anti-lock system of FIG. 1 will be reviewed. Referring first to FIG. 4, there are shown examples of three separate PWM wave forms which can be utilized to selectively control pressure in an individual wheel brake circuit, such as the rear brake control circuit 27 of FIG. 1. The top wave form in FIG. 4, designated by the reference numeral 101, represents a wave form having a period t and approximately a 33 percent duty cycle. As previously mentioned, when the three-way valve 29 is unactuated, the rear brake line 32 is connected directly to the intermediate supply line 31. Thus, when the system is in the anti-lock mode and the isolation valve 28 is closed, pressurized fluid from the pump 33 can flow directly through the three-way valve 29 into the rear brake supply line 32 to increase pressure to the brakes. When the valve is actuated, the rear brake line 32 is disconnected from the line 31 and is connected to the low pressure line 35 to reduce the pressure to the rear brakes. When the three-way valve 29 receives a PWM signal with a duty cycle of 33 percent for each cycle of the PWM signal, the supply line 32 will be connected to the high pressure line 36 for 67 percent of the time and to the low pressure line 35 for 33 percent of the time. Thus, for a given cycle of the PWM signal, the total pressure increase to the rear brakes will be greater than the pressure reduction. Thus, by maintaining this duty cycle over a plurality of PWM cycles (shown in FIG. 4 as predetermined time period P), an effective net pressure increase to the rear brakes is achieved.

The center wave form shown in FIG. 4, represented by the reference numeral 102, illustrates a PWM wave form having an approximately 45–50 percent duty cycle. When this wave form is supplied to the three-way valve 29, the increase in pressure during the time the valve is unactuated and the decrease in pressure during the time when the valve is actuated are substantially equal to one another, thus resulting in a zero net increase or decrease in pressure to the rear brakes. In this situation, the rear brake pressure will be held at a relatively constant level. It should be noted that the particular duty cycle which results in a pressure hold situation to the rear brakes will vary depending on the present value of the relative pressures in the systems, along with the particular flow characteristics of the three-way valve.

The lower wave form in FIG. 4, represented by the reference numeral 103, illustrates a PWM wave form having a 67 percent duty cycle. During a given cycle, pressure to the rear brakes will be decreased for 67 percent of the time, and increased during 33 percent of the time. This results in a net pressure decrease to the rear brakes. It will be appreciated that the wave forms illustrated and described with reference to FIG. 4 are shown as examples of how the two position, three-way valve can be utilized to increase, hold or decrease pressure to the rear brakes. When actually controlling pressure to the rear brakes, the duty cycle of the PWM wave form applied to the valve can vary between 0 and 100 percent, to obtain the desired precise pressure control for the brakes.

Referring now to FIG. 5, there is shown a wave form diagram which will be utilized to describe the operation of the anti-lock system under a particular braking condition, with reference to rear brake control circuit 27 of FIG. 1. In FIG. 5, the operation of the associated three-way valve 29 is represented by a wave form 104, the actual speed of the associated rear wheels is represented by a wave form 105, and the associated rear brake pressure is represented by a lower wave form 106. Initially, at time $t_0$, the vehicle is traveling along at a speed of $V_t$ without the vehicle brakes applied. At this time, both the isolation valve and the associated 3-way valve in each brake control circuit are unactuated such that master cylinder pressure can be supplied directly to the associated wheel brakes. At time $t_1$, the driver initiates a hard vehicle stop by fully depressing the brake pedal to quickly increase the brake pressure in the line 32 to the rear brakes and cause the vehicle to decelerate. Initially, the brake pressure in the line 32 is not sufficient to cause any lock-up of either of the rear wheels. However, shortly after time $t_1$, the rear wheel speed begins to slip relative to the actual vehicle speed (represented by the dashed curve 107) to cause the rear wheels to enter a first wheel speed departure cycle 108.

When the actual wheel speed has fallen below the actual vehicle speed by a predetermined slip threshold, this is an indication that it is desirable to enter an anti-lock control mode for the associated wheel brake. At time $t_2$, the electronic control is operative to immediately close the isolation valve 28 and energize the motor 34 to operate the pump 33. The PWM signal is then supplied to the three-way valve 29 at a predetermined duty cycle A which is selected to produce a net decrease in pressure in the rear brake line 32. The PWM signal is maintained at this duty cycle for a predetermined time period until time $t_3$, at which time the electronic control senses that the actual wheel deceleration has fallen below a predetermined level. At this point, the PWM duty cycle is immediately dropped to a level B which effectively results in a pressure increase to the rear wheels. As shown in the wave form 104, the duty cycle then ramps continuously down along ramp 104a toward a 0 percent duty cycle. As pressure is increased to the rear brakes, the actual wheel speed will begin to slip again to cause another wheel speed departure at 109. The three-way valve 29 can then be controlled in a similar manner to correct the wheel speed departure 109 and to initiate another wheel speed departure at 110.

The particular frequency at which the PWM wave form is generated can vary from one brake system to another brake system. However, it has been found that it is preferable to select a frequency having a period which is less than the time associated with the shortest wheel speed departure cycle. Thus, the three-way valve will be shuttled between its two positions during a given pressure reduction or pressure increase phase. For example, in automotive vehicles such as light trucks, it has been found that wheel speed departures on relatively high mu surfaces such as dry concrete can be as short as 60 milliseconds, and on relatively low mu surfaces such as snow or ice, can be several seconds. It has been discovered that operating the PWM signal at frequency of 50 hertz (period equals 20 milliseconds) provides satisfactory results.

Referring now to FIG. 6, there is shown a simplified flow diagram illustrating the basic operation of the anti-lock system of the present invention. In FIG. 6, a processing function 114 represents "normal" braking conditions under which the anti-lock system has not been activated and the vehicle brake pressure is under full control of the vehicle driver. During such braking conditions, the anti-lock system of the present invention continues to monitor the actual wheel speeds and calculate the deceleration and slip level of each wheel and compare these values to predetermined anti-lock actuation thresholds. This comparison function is represented by the decision point 115 wherein, if no anti-lock threshold has been exceeded, the system remains in the normal braking mode at 114. However, in the event an anti-lock threshold has been exceeded, the system enters the anti-lock mode at 116 and then executes a processing function 117 wherein the isolation valve or valves associated with particular wheel(s) for which an anti-lock threshold has been exceeded is actuated to close the valve and, simultaneously, the motor 34 is actuated to operate both the pumps 33 and 55. Next, the system enters a processing function 118 wherein a PWM signal is supplied to the respective three-way valve at a predetermined duty cycle to reduce brake pressure at a predetermined rate. The particular duty cycle of the PWM signal is typically a function of the current wheel deceleration and slip levels. Once the brake pressure reduction has caused the wheel deceleration to be reduced to a predetermined level and bring the wheel speed back up to the vehicle speed, the system enters a processing function 119 wherein the duty cycle of the PWM signal is changed to quickly increase the pressure to the associated wheel to attempt to cause another wheel speed departure.

The system then enters a decision point 120 to determine whether or not the increase in pressure provided by operating the three-way valve has resulted in a sufficient increase in pressure to cause another wheel speed departure. If not, the program branches at "NO" and enters a processing function 121 wherein the associated isolation valve is temporarily pulsed on to provide additional fluid pressure to associated rear brakes sufficient to cause another wheel speed departure. The system then enters a processing function 122, similar to the processing function 118, wherein a PWM signal is supplied to the three-way valve to decrease pressure and correct the wheel speed departure. From this point, the system enters a decision point 123 to check the status of the reset switch associated with the particular three-way valve. If the reset switch is now open, this indicates a situation as previously described wherein the driver has initially applied the brakes hard to cause the system to enter the anti-lock mode, but has now partially relieved the brake pressure without completely releasing the brake pedal such that the master cylinder output pressure has fallen below the controlled pressure to the brakes. In this situation, anti-lock braking control is no longer required, and the system branches at "YES" and returns to the normal braking mode. However, if the associated reset switch is not open, the system branches at "NO" and returns to the processing function 119 to maintain anti-lock control and cause another wheel speed departure.

In reference to FIGS. 7-10, the specific construction of the individual valving components will now be discussed in detail. Referring first to FIG. 7, there is shown a cross-sectional view of the three-way pressure control valve 29 of FIG. 1. It will be appreciated that the other three-way valves of the system can have a similar construction. In FIG. 7, the three-way valve 29 is shown mounted in a valve body 130. The valve body 130 is provided with various mounting locations and connecting passageways for connecting the individual components of the system in a specified manner. It will be appreciated that the particular construction of the valve assembly will vary depending on the number of components required. Also, the electronic control is preferably mounted adjacent to or is integral with the valve body.

The valve includes an axially shiftable armature 131 positioned between an upper or first core member 132 and a lower or second core member 133. The upper end of the armature 131 and the lower end of the first core 132 cooperate to define a first normally open ball valve, generally represented by the reference numeral 134, while the lower end of the armature 131 and the upper end of the lower core 133 cooperate to define a normally closed second ball valve, generally represented by the reference numeral 135. A helical coil spring 136 surrounds the upper portion of the armature 131 and biases the armature 131 axially downwardly to maintain the ball valve 135 in a normally closed position. The armature 131 can be shifted axially upwardly to open the ball valve 135 and close the ball valve 134 by energizing a coil 137 which surrounds a portion of the upper core member 132 and the armature 131.

The 3-way valve 29 is secured to the valve body 130 by means of an adapter 138 threaded into the valve body 130. A protective cylindrical cap 139 surrounds the coil 137 and has a lower end pressed over the adapter 138 and a reduced diameter upper end which is pressed over an intermediate portion of the upper core 132. The extreme upper end of the upper core has a connecting member 142 sealingly connected thereto. The connecting member 142 is provided with a passageway 143 coupled to receive high pressure brake fluid via the lines 36 and 31. The upper core 132 is provided with a central passageway 144 which supplies the pressurized brake fluid to the ball valve 134.

The lower core member 133 has an upper end threaded into the lower end of the adapter 138, and a lower end sealingly inserted into a passageway 145 formed in the valve body and connected to the low pressure accumulator 39 and the inlet of the pump 33 by the line 35. A central passageway 146 is formed through the core 133 for connecting the line 35 to the ball valve 135. The valve body 130 is provided with a second passageway 147 which is adapted to be coupled to the rear brake supply line 32 and is also in communication with both the ball valves 134 and 135 via an annular filter screen 148 and a longitudinal groove 149 formed in the lower core member 133.

The operation of the pressure control valve 29 can be summarized as follows. When the coil 137 is not energized, the armature 131 is biased downwardly by the spring 136 to close the ball valve 135. At this time, the ball valve 134 is open, thus allowing fluid pressure from the line 31 to flow downwardly through the central passageway 144, past the ball valve 134, around the armature 131, and into the longitudinal slot 149. From this point, fluid will flow through the annular filter screen 148 and into the passageway 147, where it is supplied to the rear brakes via the rear supply line 32. When the coil is energized, the magnetic force exerted on the armature 131 opposes the biasing force of the spring 136, and forces the armature 131 upwardly to close the ball valve 134 and open the ball valve 135. During this time, fluid pressure in the brake line 32 is reduced by fluid flow into the passageway 147, through the filter screen 148, and into the longitudinal slot 149. From this point, fluid flows past the ball valve 135 and into the central core passageway 146, where it is supplied through the valve body passageway 145 to the low pressure line 35.

The specific construction of the high pressure accumulator 37 and the bypass valve 41 is shown in FIG. 8. In the preferred embodiment of the invention, these two components are incorporated in a single assembly. As shown in FIG. 8, the high pressure accumulator assembly includes an outer plunger 151 which is slideably mounted within a cylindrical bore 152 of the valve body 130. The outer plunger 151 is biased upwardly by means of a heavy duty helical compression spring 153. A retaining cap 154 is threaded into the valve body and is provided with an air vent 155 at the lower end thereof. An inner plunger 156 has an upper end slideably disposed within a central bore of the outer plunger 151. The upper portion of the cavity 152 and the upper end of the outer plunger 151 cooperate to define a chamber 159 for storing high pressure fluid. The chamber 159 is coupled to the high pressure line 36 via a valve body passageway 161. As high pressure fluid is forced into the chamber 159, the plunger 151 will be urged downwardly to compress the spring 153.

The high pressure bypass valve is generally represented by a reference numeral 162. The bypass valve 162 includes a ball 163 which is biased downwardly by means of a spring 164 against a ball seat 165. Normally, the ball 163 blocks fluid flow down into the central bore 157 of the plunger 151. However, when the outer plunger 151 has moved downwardly a sufficient distance such that a lower end surface 166 of the inner plunger 156 engages an end wall 167 of the cap 154, a further downward movement of the inner plunger 156 is prevented, while the outer plunger 151 can continue to move downwardly an additional distance D. At this point, the extreme upper end surface 168 of the inner plunger 156 engages the ball 163 and causes the ball to be lifted from the valve seat 165. This opens the bypass valve and enables fluid to flow into the central bore 157 of the outer plunger 151, into a transverse passageway 169 formed in the sidewall of the outer plunger 151, and then into a passageway 171 formed in the valve body and connected to the low pressure line 35. The particular pressure at which the inner plunger 156 bottoms out and opens the by-pass valve 162 can be controlled by selecting the spring 153 with a predetermined spring constant.

Referring to FIG. 9, there is shown a cross-sectional view of the isolation valve 28. The isolation valve is essentially identical to the isolation valve disclosed in above-mentioned U.S. Patent Application Ser. No. 07/053,221, and therefore will not be discussed in detail herein. The only difference between the isolation valve disclosed in the above-identified patent and the isolation valve of this application is that, in this application, a seal 171 which surrounds the bottom portion of a valve seat member 172 and is inserted into a cylindrical bore 173 formed in the valve body 130 is a standard O-ring seal adapted to block fluid flow in both directions about the exterior of the valve seat member 172. In the above identified application, the seal is an annular lip seal which allows fluid flow in one direction.

The isolation valve 28 includes an axially shiftable armature 174 which is spring-biased upwardly by means of a spring 175 such that a ball valve, generally represented by reference numeral 176, is maintained in a normally open position. The armature 174 is slideably disposed within a sleeve member 177 having a closed upper end 178 which limits the upward movement of the armature 174. The valve seat member 172 is threaded into an adapter 179 which in turn is threaded into the valve body 130. A coil 181 surrounds a lower portion of the armature 174 and the upper portion of the valve seat member 172, and is protected by means of cover 182 which is pressed onto the adapter 179 and the sleeve 177. This cover 182 also functions to complete the magnetic flux path between the adapter 179 and the sleeve 177.

When the valve is in its unenergized position, the ball valve 176 is open such that fluid from the master cylinder can flow upwardly through a central passageway 183 provided in the valve seat member 172, past the ball valve 176, and downwardly along a longitudinal slot 184 formed along the valve seat member 172. From this point, the fluid enters an annular passageway 185 surrounding the valve seat member 172 and exits the passageway 185 through a transverse passageway 186 connected to the intermediate supply line 31. When the coil is energized, the armature 174 is urged downwardly to close the ball valve 176, thus blocking fluid flow between the master cylinder line 15 and the intermediate supply line 31.

Referring to FIG. 10, there is shown a cross-sectional view of the reset switch 44. The reset switch includes a hollow plug 190 which is threaded into a passageway 191 formed in the valve body 130. The passageway 191 is connected to a first transverse passageway 192 connected to receive fluid from the brake supply line 32, a second transverse passageway 193 connected to receive fluid pressure from the master cylinder line 15, and a third passageway 194 connected to receive fluid from the low pressure line 35. A plunger 195 is slideably disposed within the passageway 191, and has O-rings 196a, 196b and 196c mounted thereon for isolating the passageways 192, 193, and 194 from one another.

A switch contact assembly 196 is mounted within the upper portion of the hollow plug 190. In particular, when the plunger 195 is in its lowermost position as shown in FIG. 10, the switch assembly is biased to a normally closed position. However, when the plunger is moved upwardly, the normally closed switch contacts will open. As previously discussed, the switch assembly 196 is moved from a normally closed to a normally open position when, during normal, non-anti-lock braking conditions, the pressure in the passageway 194 (low pressure line 35) increases sufficiently to urge the plunger 195 upwardly. As previously mentioned, this is an indication of a leaking valve seat in the associated three-way valve 29. Also, as previously mentioned, during anti-lock braking conditions, the reset switch functions to monitor the differential pressure between the master cylinder pressure (line 15), and the actual pressure being supplied to the rear brakes (line 32). In these instances, when the system enters the anti-lock mode and the isolation valve is closed, the master cylinder pressure in the passageway 193 will become greater than the rear brake pressure in the passageway 192, thus causing the plunger 195 to be forced upwardly to open the switch. The switch will remain in its open position until the master cylinder pressure in the passageway 193 becomes equal to or less than the rear brake pressure in the passageway 192. This provides an indication that it is desirable to release the anti-lock control.

The present invention has been illustrated and described in its preferred embodiments. However, it will be appreciated that the present invention can be practiced in a manner other than that specifically illustrated and described. For example, there are various types of solenoid actuated valves which can be used. Also, the invention is not limited to the specific system arrangements shown in FIGS. 1-3 of the application, and could readily be incorporated into other anti-lock systems including more or less individual wheel circuits.

What is claimed is:

1. A braking system for controlling a wheel brake of at least one wheel of a wheeled vehicle comprising:
   a fluid pump having an inlet and an outlet;
   a two position, three-way valve having a first port connected to the wheel brake, a second port connected to said outlet of said pump, and a third port connected to said inlet of said pump;
   said valve only moveable between a first position wherein said first port is connected to said second port to increase pressure to the wheel brake, and a second position wherein said first port is connected to said third port to decrease pressure to the wheel brake;
   control means for operating said valve to control the application of pressure to the wheel brake, said control means including means for cyclically moving said valve between said first and second positions during a predetermined time period to alternately increase and decrease pressure to the wheel brake, said control means operable to modulate the time periods during which said valve is maintained in said first and second positions to control the effective pressure to the wheel brake to obtain a net increase, decrease, or constant pressure to the wheel brake during said predetermined time period.

2. The braking system according to claim 1 wherein said three-way valve is solenoid-activated and said control means generates a pulse-width-modulated signal to operate said valve.

3. The braking system according to claim 2 wherein said pulse-width-modulated signal is generated at a frequency having a period less than said predetermined time period.

4. The braking system according to claim 3 wherein said frequency is 50 Hertz.

5. The braking system according to claim 1 wherein said braking system is an anti-lock braking system.

6. An anti-lock braking system for a wheeled vehicle having at least one wheel provided with a wheel brake, a brake pedal operable by the vehicle driver, and a master cylinder actuated by the brake pedal and having an outlet connected to supply pressurized brake fluid to actuate the wheel brake, said system comprising:
   a fluid pump having an inlet and an outlet;
   a two position, three-way valve having a first port connected to said wheel brake, a second port connected to both said outlet of said pump and the outlet of the master cylinder, and a third port connected to said inlet of said pump;
   said valve only moveable between a first position wherein said first port is connected to said second port to increase pressure to the wheel brake and a second position wherein said first port is connected to said third port to decrease pressure to said wheel brake;
   control means for operating said valve to control the application of pressure to said wheel brake, said control means including means for cyclically moving said valve between said first and second positions during a predetermined time period to alternately increase and decrease pressure to said wheel brake, said control means operable to modulate the time periods during which said valve is maintained in said first and second positions to control the effective pressure to said wheel brake to obtain a net increase, decrease, or constant pressure to said wheel brake during said predetermined time period to prevent lock-up of the associated wheel.

7. The anti-lock braking system according to claim 6 wherein said three-way valve is solenoid-activated and said control means generates a pulse-width-modulated signal to operate said valve.

8. The anti-lock braking system according to claim 6 including a solenoid actuated, normally open isolation valve connected between the outlet of the master cylinder and said second port of said valve.

9. The anti-lock braking system according to claim 8 including a reset switch connected to monitor the differential pressure between fluid at the output of the master cylinder and fluid supplied to said wheel brake.

10. The anti-lock braking system according to claim 8 including a check valve connected between the outlet of the master cylinder and said outlet of said pump for preventing fluid flow from the master cylinder to said outlet of said pump.

11. The anti-lock braking system according to claim 8 including a low pressure accumulator connected to said inlet of said pump.

12. The anti-lock braking system according to claim 11 including a high pressure accumulator connected to said outlet of said pump.

13. The anti-lock braking system according to claim 12 including a high pressure by-pass valve connected between said outlet and said inlet of said pump.

14. An anti-lock brake system for a wheeled vehicle having a pair of front wheel brakes and at least one pair of rear wheel brakes, a brake pedal operable by the vehicle driver, and a master cylinder actuated by the brake pedal for supplying pressurized brake fluid to actuate the front and rear wheel brakes, said system comprising:

a first anti-lock control circuit connected between the master cylinder and the front wheel brakes and including a pump for providing a supply of pressurized brake fluid, said first control circuit operable in an impending front lock-up condition to control the application of fluid pressure to the front wheel brakes by cyclically relieving and reapplying pressure to maintain the front wheels in a predetermined wheel slip range throughout the remainder of the stop; and a second anti-lock pumpless control circuit connected between the master cylinder and the rear wheel brakes, said second control circuit operable in an impending rear lock-up condition to control the application of fluid pressure to the rear wheel brakes by selectively relieving pressure to correct the rear lock-up condition and to maintain the rear pressure at a relatively constant level throughout the remainder of the stop.

* * * * *